Dec. 22, 1970  L. P. DUNCAN  3,549,292
PIPELINE MILKING SYSTEM
Original Filed Oct. 12, 1965  5 Sheets-Sheet 1

INVENTOR
LLOYD P. DUNCAN
BY Mason, Mason & Albright
ATTORNEYS

Dec. 22, 1970   L. P. DUNCAN   3,549,292
PIPELINE MILKING SYSTEM
Original Filed Oct. 12, 1965   5 Sheets-Sheet 2

INVENTOR
LLOYD P. DUNCAN

BY Mason, Mason & Albright
ATTORNEYS

Dec. 22, 1970     L. P. DUNCAN     3,549,292
PIPELINE MILKING SYSTEM
Original Filed Oct. 12, 1965     5 Sheets-Sheet 3

INVENTOR
LLOYD P. DUNCAN

BY Mason, Mason & Albright
ATTORNEYS

Dec. 22, 1970  L. P. DUNCAN  3,549,292
PIPELINE MILKING SYSTEM
Original Filed Oct. 12, 1965  5 Sheets-Sheet 4
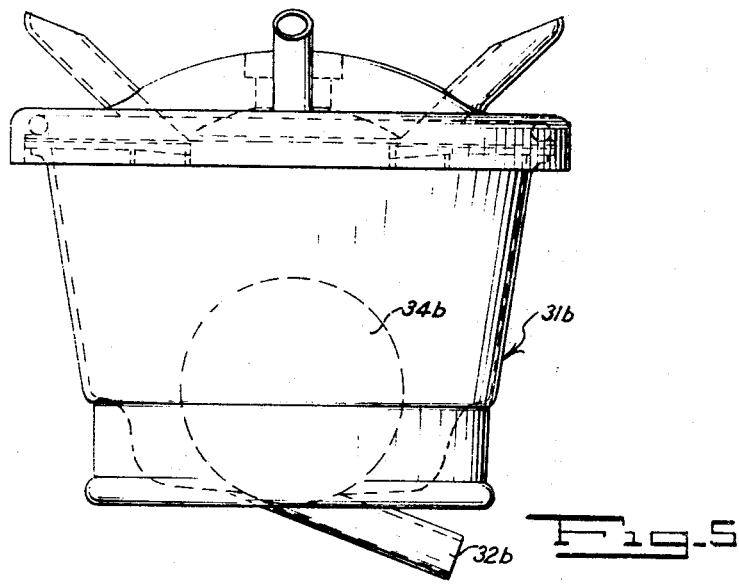
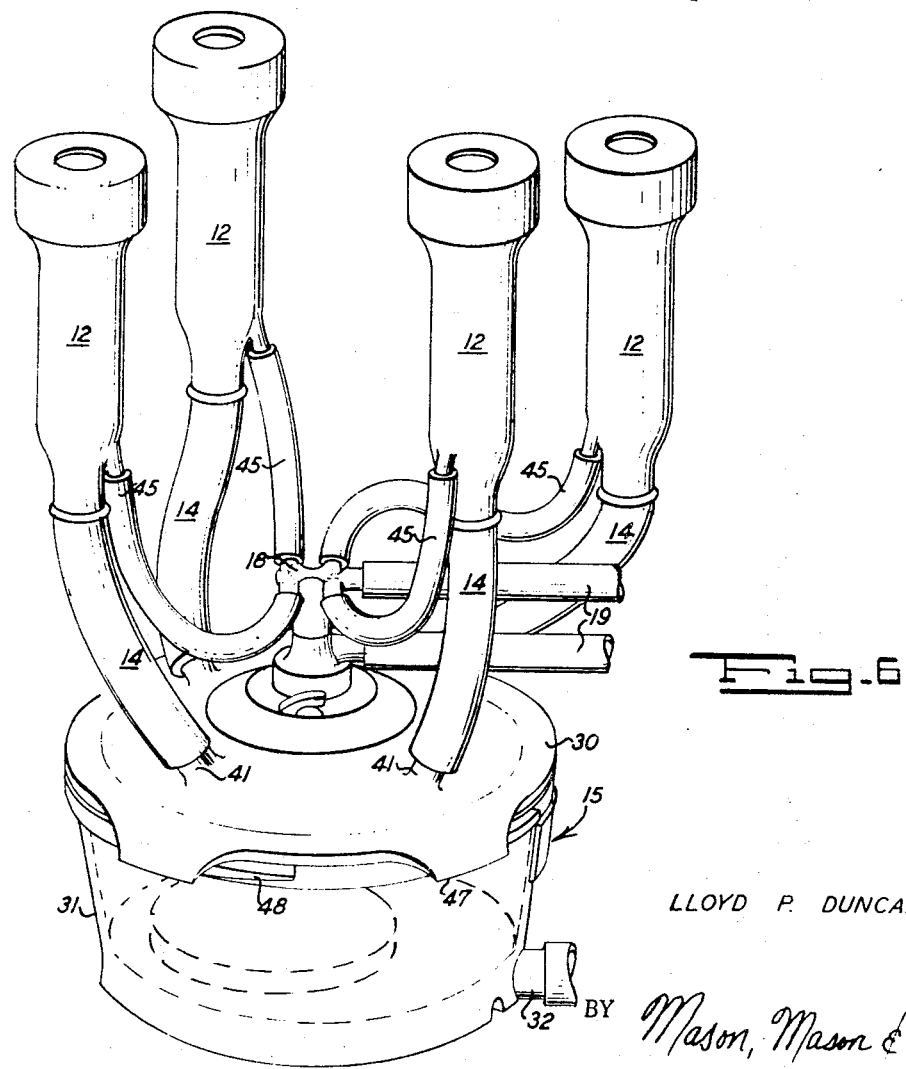
INVENTOR
LLOYD P. DUNCAN
BY *Mason, Mason & Albright*
ATTORNEYS Dec. 22, 1970   L. P. DUNCAN   3,549,292
PIPELINE MILKING SYSTEM
Original Filed Oct. 12, 1965   5 Sheets-Sheet 5

INVENTOR
LLOYD P. DUNCAN
BY Mason, Mason & Albright
ATTORNEYS

United States Patent Office 3,549,292
Patented Dec. 22, 1970

3,549,292
PIPELINE MILKING SYSTEM
Lloyd P. Duncan, Washington, Mo., assignor to Zero Manufacturing Company, Washington, Mo., a corporation of Missouri
Application Oct. 12, 1965, Ser. No. 495,290, now Patent No. 3,406,663, dated Oct. 22, 1968, which is a continuation-in-part of application Ser. No. 398,192, Sept. 22, 1964. Divided and this application Mar. 20, 1968, Ser. No. 714,534
The portion of the term of the patent subsequent to Mar. 19, 1985, has been disclaimed
Int. Cl. A01j 5/04
U.S. Cl. 119—14.41
10 Claims

ABSTRACT OF THE DISCLOSURE

A milking system wherein a uniform vacuum is applied through a duct to the upper part of the claw of a milker and thence through short large bore vertical tubes to the teat cup whereby the cows teats are maintained at a constant vacuum during the milking operation.

CROSS REFERENCES TO RELATED APPLICATIONS

This invention relates to a mechanical milker and is a divisional application of my application Ser. No. 495,290, filed Oct. 12, 1965, now U.S. Pat. No. 3,406,663, which is a continuation-in-part application of my application Ser. No. 398,192, filed Sept. 22, 1964, now U.S. Pat. No. 3,373,720.

SUMMARY, BACKGROUND AND OBJECTS OF THE INVENTION

The invention particularly relates to a milking machine having a vacuum source in direct communication with the milk receiving receptacle and teat cup of the milker and a filter interposed between the teat cup inlets to the receptacle and the milk outlet therefrom to a pipeline system and a bulk milk vacuum tank or other vacuum milk receiving means whereby milk is gravity filtered at the milker and a solid stream of milk is drawn through the pipeline to the milk receiving means. The invention also relates to a milking machine, which includes vibratory means to promote blood circulation in the animal's teats during the milking operation.

There is considerable evidence associating instability of mechanical milking systems with udder irritation. Vacuum fluxations in a mechanical milking machine are known to produce an increase in the leukocyte count. In addition, the agitation of milk in the presence of air is well known to cause lipolysis. With conventional types of pipeline milking machines, air is intentionally bled into the claw or manifold, which directly receives milk from the cow's teats, where it mixes with the milk and assists in carrying it to a releaser or a bulk milk vacuum tank. However, this air intake of the milk is considered one of the main causes of rancidity in the milk. Rancid milk has a relatively short storage life and, thus complicates the present system of bulk milk tanks with the every-other day pick-up of the milk and the longer average storage of milk at the processing plant. Once present, this flavor cannot be removed from the milk. This problem of rancidity is extremely complex, involving nutrition, mechanical handling, temperature changes and other environmental factors. The foaming of the milk by air injection so that it may be carried through pipelines favors the development of rancid flavor. An air leakage into a milk pipeline during milking operations is known to cause a marked increase in rancid flavor—often severe enough to make the milk unfit for human consumption. This problem is aggravated when the pipeline includes risers.

One of the causes of vacuum fluxation is that conventional filters in the receiving receptacle of the milker or pipeline constitutes a resistance to fluid communication—particularly to air when the filter is wet. Because of this, some milk sanitarians recommend that filters in pipelines and receiving receptacles of the milker be removed. Although this may alleviate the problem somewhat, it is not a complete solution since considerable fluxation is due to the bleeding of air into the system, the vertical rise of the milk, and line resistance.

For largely the foregoing reasons, the pipeline system of milking has not been well accepted in large dairy areas where the stanchion barn is widely used.

An object and advantage of the invention lies in its practicable solution of the foregoing problems whereby, among other things, fluxation of vacuum at the teat cups is eliminated, the size of the milk lines is greatly reduced, the power requirements of the vacuum pump are also significantly reduced, considerably less wash water and detergent is required compared to conventional washing systems, and the milk can be filtered without restricting air flow so that visual milking and inspection are possible. The invention also permits installation of pipelines without the limitations of conventional systems wherein the pipelines are inclined downwardly with respect to the milk recovery tank or, alternatively, pumping means is interconnected to the milk receiving tank. Thus, the pipeline of the invention may be more readily conformed to the design of the barn.

A further problem in the industry relates to the method utilized to massage the teats of the cow during milking operations. A somewhat complex structure exists whereby the teat cups include double walls—that is an outer shell and inner resilient liner which are spaced apart. Alternating degrees of vacuum commnicating with the space between walls cause the inner liner to pulsate and, accordingly, massage the teats of the farm animal during the milking operation. However, it will be appreciated that the space in which the vacuum acts for massaging purposes is a dead end and extremely difficult to clean by conventional cleaning equipment. Both the pulsator and the space between the liner and shell frequently accumulate considerable dirt and grime after a period of use. Sanitarians in the milk industry consider this to be a problem and have long criticized conventional milkers for this reason. A deficiency of this type is particularly troublesome in the dairy industry which is dominated by sanitation requirements.

The elimination of the dead-end space by the invention disclosed herein is, thus, advantageous for reasons of sanitation and that it lends itself to a total clean-in-place system which includes the vacuum line to the milker which, in turn, communicates directly with the teat cups. Accordingly, this invention permits the automatic cleaning of all milk contact surfaces exposed to the milk or from which liquids or other material may drain, drop, or be drawn into the milk.

A further object of this invention is to provide a milking machine wherein air is removed from, rather from intentionally admitted to the vicinity of, milk that is received in the claw or milk receiving receptacle from the teat cups, such milking machine to be lightweight and capable of depending directly from the animal's teats, and including a filter which both filters the milk and stops the flow of milk foam to the air removing connection.

It is a still further object of this invention to provide apparatus which promotes blood circulation in the animal's teats during the milking operation, eliminates the need for double-walled teat cups and vacuum pulsators with the attendant problems of sanitation which they create.

It is a yet further object of the invention to provide an improved milking system wherein the milk is maintained in essentially the same sterile condition in which it leaves the cow until it is delivered to the milk hauler.

Further objects and advantages will appear as the description progresses, reference being had to the accompanying drawings in which:

BRIEF DESCRIPTION OF THE DRAWINGS

FIG. 5 is a side elevational view of the modified embodiment of the milker unit in accordance with the invention;

FIG. 6 is an enlarged view of the teat cups and milker unit shown in FIG. 1;

DESCRIPTION OF THE PREFERRED EMBODIMENTS

Figure 1:
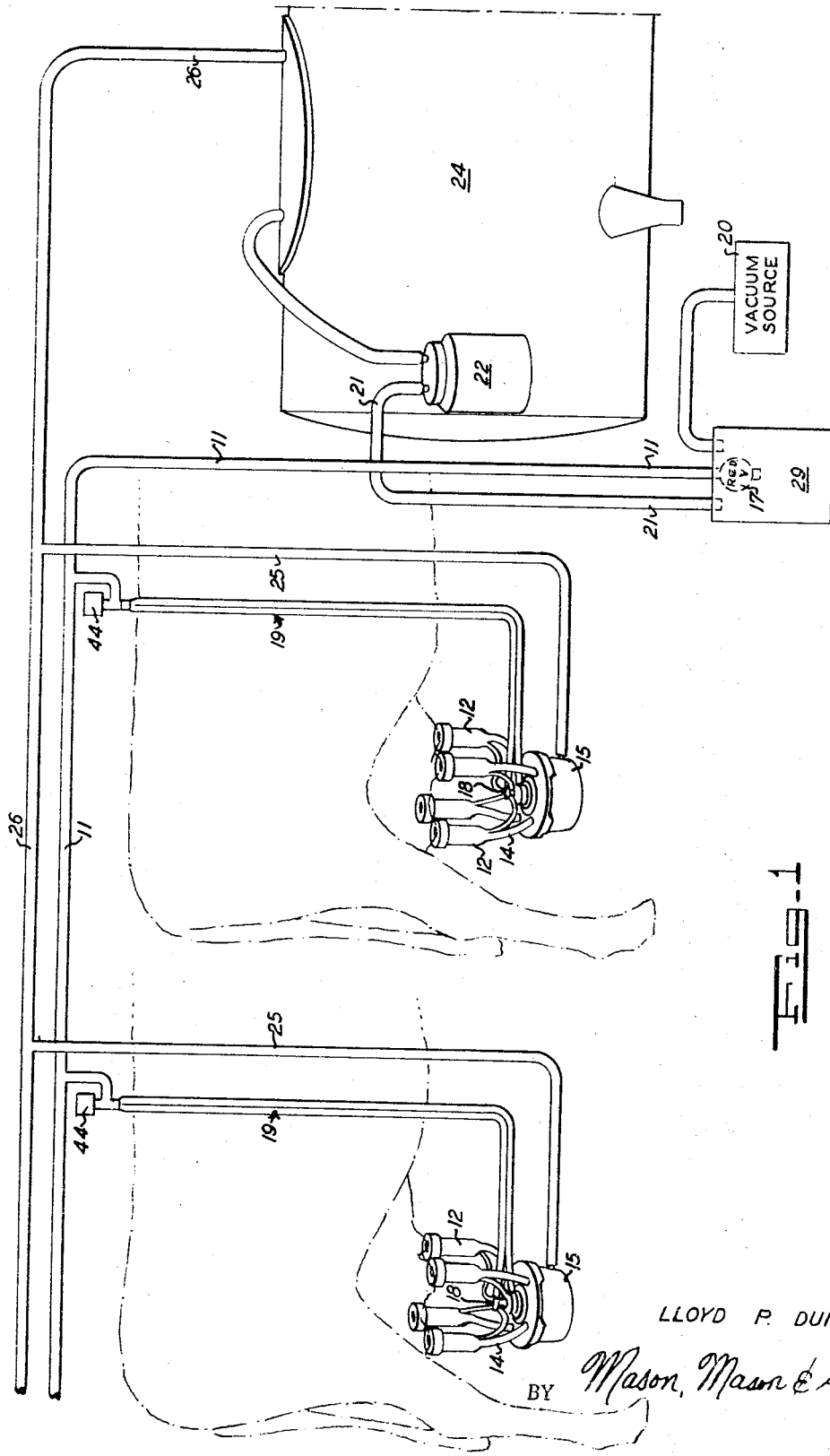
FIG. 1 is a side elevational view showing part of the milking barn in the milk receiving room with the pipeline connections.

Referring to FIG. 1, it will be noted that a conventional set of teat cups 12 connects through discharge passages 14, to the milk receiving receptacle 15. An air divider 18 operates in the upper part to convey a pulsating vacuum to the teat cups 12 by means of the upper branch of a double vacuum line 19 which connects (via pulsator 44) to a vacuum line 11 which is maintained at a constant vacuum of say 11 inches by means of a vacuum source comprising reducing valve 17. Valve 17 is interposed within trap 29 in line 11 between the connections to the receptacles 15 and a further vacuum source designated 20. The double line 19 also communicates in its lower branch through the lower part of air divider 18 with the upper part of the milk receiving receptacle 15, as will subsequently be described in greater detail. The vacuum source 20 communicates via trap 29 through a pipe 21 to a trap 22 and into the bulk milk vacuum tank 24 wherein it maintains a desired degree of vacuum—say 18 inches or more of vacuum. A milk discharge conduit 25 leads from the lower portion of receptacle 15 into the main milk pipeline 26 which affords a passageway directly into the bulk milk vacuum tank 24.

Figure 2:
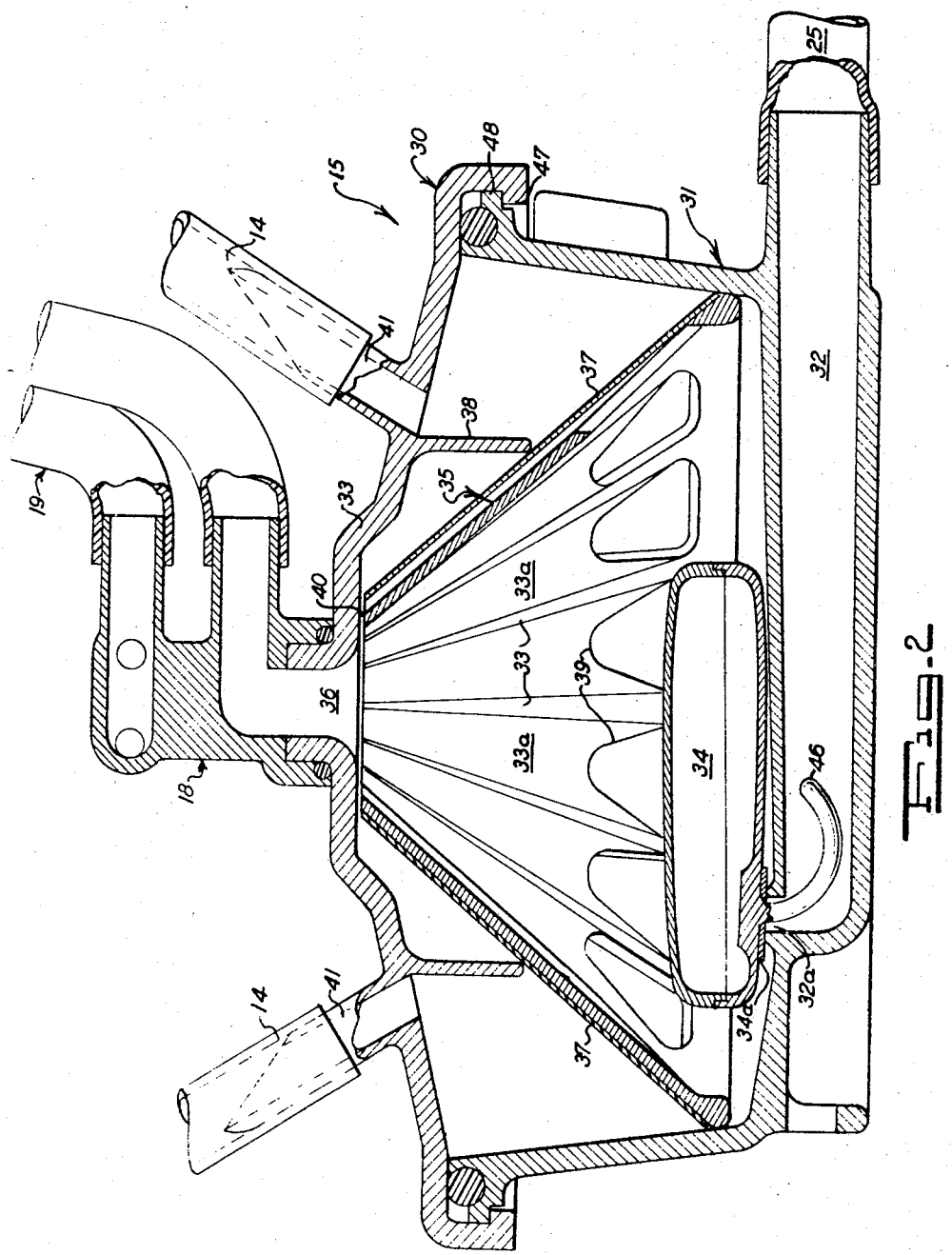
FIG. 2 is a sectional view of the milk receiving receptacle in accordance with the invention.
Figure 3:
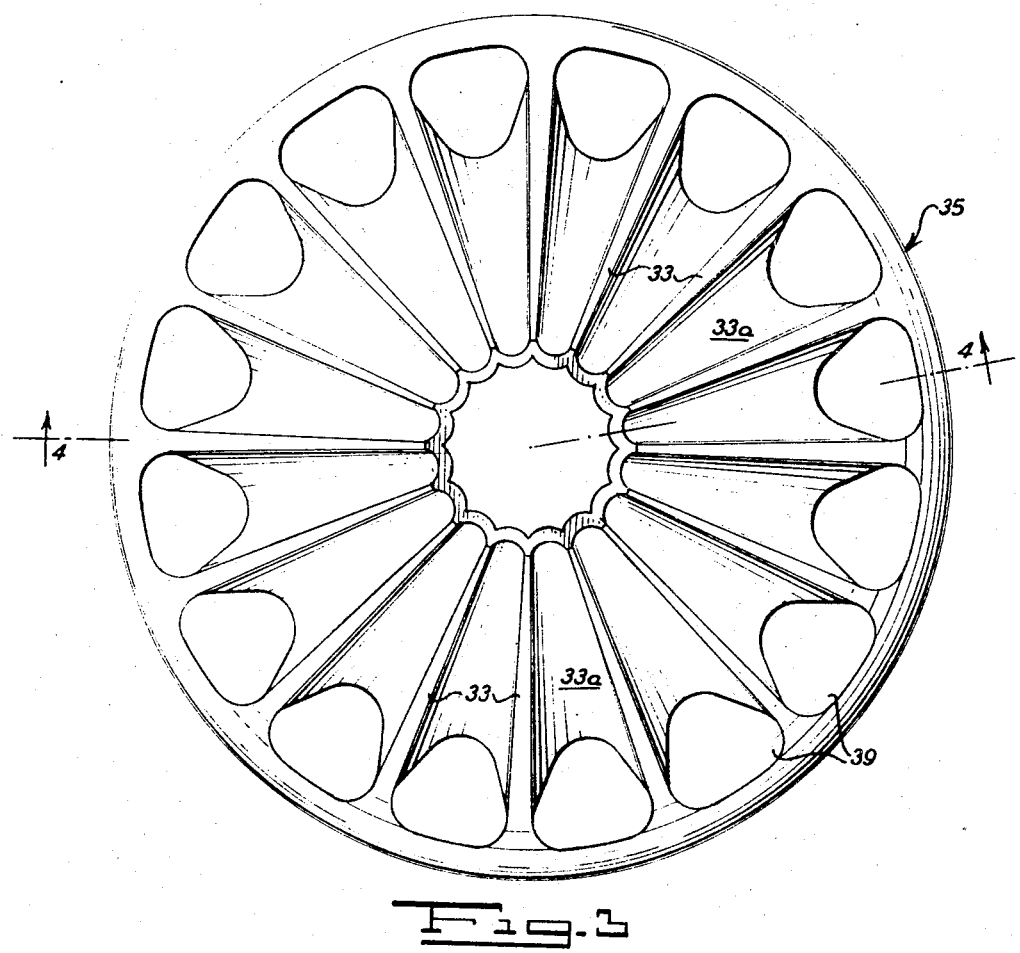
FIG. 3 is a plan view of the baffle which is carried in the milk receiving receptacle.
Figure 4:
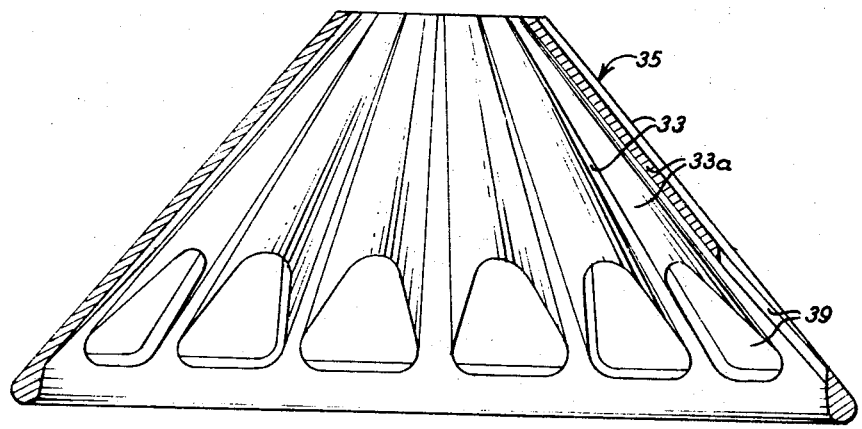
FIG. 4 is a sectional side elevational view of the baffle member shown in FIG. 3 taken on lines 4—4 of FIG. 3.

Referring now particularly to FIG. 2, it will be noted that the milk-receiving receptacle 15 has a lid portion 30 and a container portion 31. The milk discharge conduit 25 communicates directly with a discharge connection 32 leading from the lower part of the container portion 31. Operating to open and close the discharge connection 32 in response to the level of milk within the container portion 31 is a valve means comprising a float 34. A baffle 35 (shown separately in FIGS. 3 and 4) rests in the lower part of the container portion 31 and extends upwardly to surround substantially a vacuum connection 36 in the upper part of the lid portion 30. A filter pad 37, which overlies the baffle 35 to make a combination baffle and filtering unit, functions to prevent milk foam from entering the vacuum connection 36. It will be noted that the filter pad 37 and the baffle 35 substantially coincide with the surface of a truncated cone. The orifices 39 are relatively large and substantially of triangular configuration. Between the orifices 39 and extending upwardly are a plurality of ribs 33 with intervening shallow depressions 33a. Milk seeping through the filter tends to flow down the depressions to the orifices 39. The baffle 35 is strong and the filter pad 37 is well supported with this structure. The baffle and filter combination act together with deflector 38 to direct the flow of milk which might otherwise cause or aggravate a foam condition if squirted in streams of milk directly to the bottom of the container portion 31. Filtration is improved by the structure disclosed in that extraneous matter is not dispersed over the entire surface but tends to settle below the orifices 39 leaving the upper portion of the filter pad 37 free for milk flow.

It is important to note that there is a passageway designated 40 which is large enough for air to be drawn from the milk receiving receptacle 15 but small enough to prevent the passage of foam. This passageway 40 serves to insure that the vacuum on the teat cup does not vary due to blockage by foam.

The lid portion 30 includes, in effect, a manifold with four nipples 41 extending outwardly spaced approximately 90 degrees apart around the vertical centerline of the milk receiving receptacle 15. The milk passages 14 from the teat cups connect to these nipples 41 in such a way that the entire milking unit may be hung from the animal's teats without the necessity of a belt or other support means. It has been found that the milker depends generally from a cow's teats with an inclination which is slightly lower to the rear. For this reason, the opening from connection 32 is disposed to rear of receptacle 15.

A conventional pulsator 44 is connected in the branch of the double line 19 which leads from the upper part of air divider 18. From such upper part, four pulsator lines 45 connect to the teat cups 12 in a manner well known to the art. It will be understood that the pulsator 44 operates only on the vacuum passing through the corresponding branch of double lines 19 which connect operatively to pulsator line 45.

The float 34 is generally of a hollow construction and includes a hook member 46 which fits into the discharge connection 32 to prevent the float's displacement when the float 34 rises due to the level of milk within the container portion 31. It will, however, be appreciated that with the baffle member 35 in place, the float 34 cannot rise to such degree that the hook member 46 is displaced from the discharge connection 32. In addition, the opening portion 32a may be in the form of a slot transverse to hook 46 which assists in preventing dislodgment of the hook 46. However, for cleaning purposes, when the baffle 35 is removed, the float valve 34 is also easily removable. When there is little or no milk in the container portion 31, the float 34 seats against opening portion 32a with a gasket 34a disposed around the hook 46. It will be appreciated that a number of different means may be employed to make the discharge valve responsive to the level of milk in receptacle 15. For example, an electric valve responsive to probes within receptacle 15 may, in a manner well known to the art, be connected to actuate when milk is present in receptacle 15.

The lid portion 30 has a plurality of inwardly extending tapered flanges 47 which cooperate with a plurality of locking tabs 48 about the upper part of the periphery of the container portion 31 whereby the lid portion 30 can be secured to the container portion 31 by turning the latter so that its plurality of inwardly extending flanges 47 cooperate with the locking tabs 48 as the lid portion 30 is turned relatively to the container portion 31 to tighten the portions together.

Figures 7, 8:
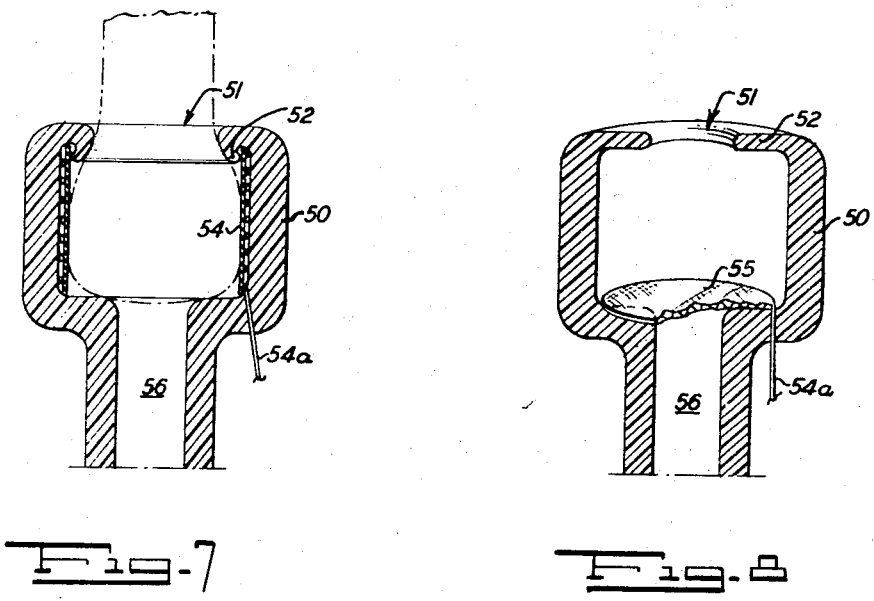
FIG. 7 shows a novel teat cup including a lip to prevent air leakage and an electrical vibration means.
FIG. 8 shows a perforated screen of sanitary construction connected to an electrical conductor and placed to prevent undue extension of the animal's teat into the teat cup.

FIG. 7 illustrates a teat cup distinctive from the conventional teat cup in that the usual pulsator liners are absent. Thus, it will be noted that the teat cup 50 incorporates a flexible rubber opening 51 that fits on the end portion of the animal's teat with the inwardly extending portions 52 of opening 51 serving hermetically to seal the teat cup 50 on the animal's teat and create a ballooning effect around the circular muscles that hold the milk in the animal. This effect tends to open the milk canal and permits the milk to flow freely into the teat cup. To eliminate the red and blue teat condition which is caused by the blood being held in the end of the animal's teat, an electrical current through the conductor 54, which may be conductive rubber, stimulates blood circulation within the animal's teat. A perforated screen 55 (see FIG. 8) may be placed at the bottom of the teat cup 50 just prior to the entrance of the passageway 56 to prevent the end of the teat from being drawn into the passage 56 and thus restrict blood circulation in the teat. It will be recognized that the current flow from electrical conduit 54a to conductor 54 or screen 55 is pulsed in such a manner as to induce sufficient circulation of the blood in the teat during milking. Preferably, electric current of high frequency (say 500–600 c.p.s.) and low voltage (say 6 volts) is utilized to best advantage in that the cow is not shocked but rather massaged and the stimulation of the muscles is sufficient for its purpose.

The modification shown in FIG. 5 is essentially similar to the apparatus shown in FIG. 2 except that the discharge connection 32b is located in the bottom of the container portion 31b and the valve 34b is a ball float which acts to close the discharge connection 32b in response to a low level of milk within the container portion 31a and conversely to open the discharge connection 32b when the level of milk is sufficiently high.

Figure 9:
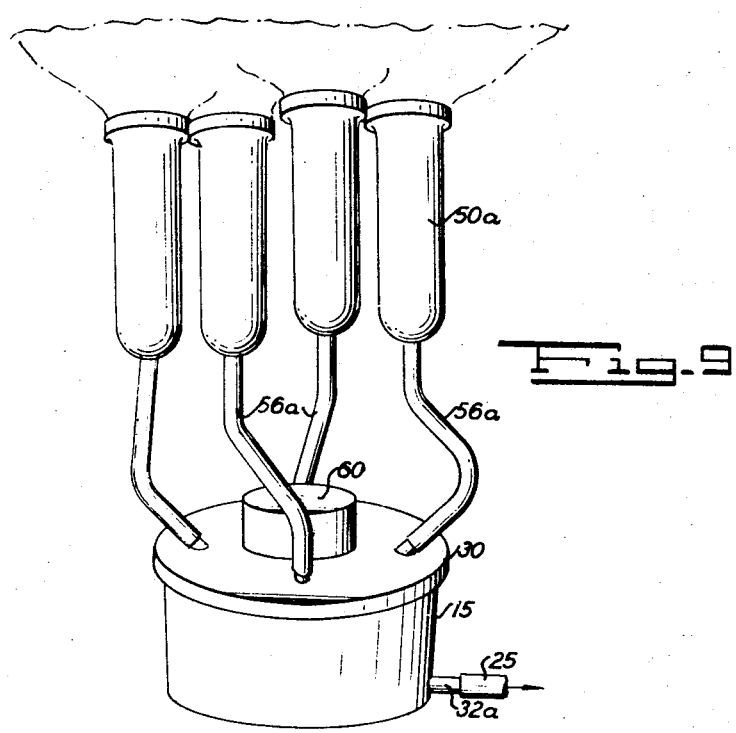
FIG. 9 is similar to FIG. 6, but showing a modified teat cup construction wherein a mechanical vibrator is placed upon the milk receiving receptacle to promote blood circulation in the animal's teats.

FIG. 9 shows a set of teat cups 50a which are similar to the teat cups 50 except that there is no electrical conductor 54. It will be noted that these conduct through passageways 56a directly into the receptacle 15. Placed on top of the lid portion 30 is a mechanical vibrator 60 which is actuated by electricity or other suitable power transmission means that causes the entire unit including the teat cups 50 to vibrate at a rapid rate which is sufficient to massage the teats of the farm animal and promote the circulation of blood within the teats. No detailed description will be given for the vibrator 60 inasmuch as such vibrators are well known for the purposes of massaging and physical therapy.

For the foregoing, it will be appreciated the fluctuations of vacuum at the animal's teats are minimized by the invention to the extent that where they are practically non-existent. Because of the steady vacuum, it has been found that the amount of vacuum necessary to be applied at the animal's teats may be as low as six inches and even lower, if desired. With conventional milkers, a higher vacuum is necessary as a safety factor to prevent the displacement of the milker from the cow's teats. In the present invention, not only are fluctuations of vacuum no longer present but also the construction is such that the weight of the milk receiving receptacle 15 is less than one-half of that of the conventional milker with the weight depending directly downward from each teat, which again reduces the degree of vacuum necessary to maintain the unit on the farm animal. The weight reduction results from the simplicity of the apparatus and also from the use of lightweight plastic materials, such as polycarbonate resins in the manufacture of the apparatus. Accordingly, it will be recognized that an advantage of this invention is that the vacuum at the vacuum connection 36 may be regulated as desired for the comfort of the farm animal and to insure that the exposure of the milk to air is minimal, whereas the degree of vacuum applied at the discharge connection 32 to move milk to the bulk milk vacuum 24 can be practically any amount that the system is capable of pulling.

The only requirement is that the higher degree of vacuum be sufficiently high to pull the milk into the bulk milk vacuum tank 24. In this connection, a differential of approximately one inch of mercury should be allowed for each foot of rise that the milk must travel from the milk receiving receptacle 15 to the bulk milk vacuum tank 24. Since it is advantageous to have the vacuum within the bulk milk vacuum tank 24 as high as possible, with the vacuum at the animal's teats at say 7 inches, there is no problem about rapid conveyance of the milk to the bulk milk vacuum tank in even the largest of pipeline milking systems.

Vibration in the cow's teats assists the flow of milk at low vacuums of say 6 inches. This can be achieved by the use of a conventional vane type vacuum pump or other pump which produces small rapid vacuum variations for vacuum source 20. Such variations cause valve 17 to flutter and the vibrations of the flutter are communicated in the instant invention directly through the low vacuum to the cow's teats. Due to this phenomenon, an adequate flow of milk is attainable at relatively low vacuums.

The above description and drawings disclose several embodiments of the invention. Specific language has been employed in describing the several figures. Nevertheless, it is to be understood that no limitations of the scope of the invention is thereby contemplated for the various alterations and modifications may be made as may occur to one skilled in the art to which the invention relates.

What I claim as new and desire to secure by Letters Patent of the United States is:

1. A pipeline milking system which comprises an operating vacuum pipe, a teat cup including a member defining a central channel and a jacket surrounding said member, a claw, the interior of said claw being hermetically closed to the atmosphere during milking operations, means for removing milk from said claw, a short milk outlet tube which is substantially vertically disposed in operating position interconnecting said claw and said channel of said teat cup, a pulsator, a pulsation tube interconnecting said jacket and said operating vacuum pipe via said pulsator, means for maintaining a substantially constant vacuum in said operating vacuum pipe, and a duct connecting the upper part of said claw to said operating vacuum pipe whereby when a farm animal's teat is received in said channel, the vacuum pulled in said channel from said operating vacuum pipe via said claw and said duct and the vacuum in said jacket between pulsations from said operating vacuum pipe via said pulsator and said pulsation tube are substantially equal.

2. A pipeline milking system which comprises an operating vacuum pipe, a teat cup, a claw, said claw being hermetically closed to the atmosphere during milking operations, a short milk outlet tube which is substantially vertically disposed throughout its length, means for removing milk from said claw including valve control means, said milk outlet tube directly interconnecting said claw and said teat cup, means for maintaining a substantially constant degree of partial vacuum in said operating vacuum pipe, a duct interconnecting the upper portion of the interior of said claw with said operating vacuum pipe throughout the milking operation whereby when said teat cup receives the teat of a milk-producing animal, the same degree of vacuum exists in said teat cup as in said claw and said operating vacuum pipe, and means to stimulate the teat of a milk-producing animal received in said cup whereby milk is induced to issue therefrom.

3. A pipeline milking system according to claim 2 wherein said means to stimulate the teat of a milk-producing animal comprises means for pulsating said teat cup.

4. A pipeline milking system according to claim 3 wherein milk is removed from said claw to a milk pipeline in said system by providing a vacuum source which subjects said milk pipeline to a higher degree of vacuum than the degree of vacuum in said claw.

5. A pipeline milking system according to claim 2 wherein there are four like teat cups and outlet tubes leading therefrom connected into said claw, said claw depending from said teat cups.

6. A pipeline milking system according to claim 2 wherein means for continually withdrawing milk from said claw is provided.

7. A pipeline milking system according to claim 6 wherein said means for continually withdrawing milk from said claw comprises a further vacuum operatively connected to said claw, said further vacuum being substantially higher in degree than said first-mentioned vacuum.

8. A pipeline milking system according to claim 2 which includes a pulsator and a pulsation tube interconnecting said teat cup and said operating vacuum pipe which comprises said means to stimulate the teat to induce milk to issue therefrom.

9. A pipeline milking system according to claim 2 wherein there is provided a pulsator and a pulsation tube operatively connected to a vacuum source to pulsate a teat in said teat cup, said vacuum for pulsating said teat cup being not greater in degree than said vacuum in said operating vacuum pipe.

10. A pipeline milking system according to claim 9 wherein the vacuum that pulsates said teat cup is substantially the same as said vacuum in said operating vacuum pipe.

References Cited

UNITED STATES PATENTS

| 1,220,172 | 3/1917 | Berthelsen | 119—14.52 |
| 1,394,433 | 10/1921 | Leitch | 119—14.46 |
| 2,606,524 | 8/1952 | Daily et al. | 119—14.41 |
| 2,703,068 | 3/1955 | Hodsdon | 119—14.18 |
| 2,718,208 | 9/1955 | Tanner | 119—14.08 |
| 2,809,607 | 10/1957 | Golay | 119—14.41 |
| 3,077,180 | 2/1963 | Hagg et al. | 119—14.01 |
| 3,172,391 | 3/1965 | Norton | 119—14.28 |
| 3,189,002 | 6/1965 | Noorlander | 119—14.07 |
| 3,373,720 | 3/1968 | Duncan | 119—14.02 |

HUGH R. CHAMBLEE, Primary Examiner